United States Patent
Maine, Jr. et al.

(10) Patent No.: US 6,360,882 B1
(45) Date of Patent: Mar. 26, 2002

(54) CONVEYOR BELT AND METHOD OF MAKING THE SAME

(75) Inventors: Robert E. Maine, Jr., Hebron; H. William West, Cambridge, both of MD (US)

(73) Assignee: Cambridge, Inc., Cambridge, MD (US)

(*) Notice: Subject to any disclaimer, the term of this patent is extended or adjusted under 35 U.S.C. 154(b) by 0 days.

(21) Appl. No.: 09/335,687

(22) Filed: Jun. 18, 1999

(51) Int. Cl.$^7$ ............................................... B65G 17/06
(52) U.S. Cl. ........................................ 198/852; 198/844.1
(58) Field of Search .................................. 198/849, 852, 198/848, 844.1

(56) References Cited

U.S. PATENT DOCUMENTS

| | | |
|---|---|---|
| 2,126,274 A | 8/1938 | Noffsinger et al. |
| 3,202,387 A | 8/1965 | Andrews et al. |
| 3,225,898 A | 12/1965 | Roinestad |
| 3,300,030 A | 1/1967 | Scherfel |
| 3,542,188 A | 11/1970 | Kinney, Jr. |
| 3,731,894 A | 5/1973 | Curran et al. |
| 4,078,655 A * | 3/1978 | Roinestad .................... 198/848 |
| 4,138,011 A * | 2/1979 | Lapeyre |
| 4,318,469 A | 3/1982 | Hufferath-Kassner |
| 4,395,308 A * | 7/1983 | Dawes ........................ 162/232 |
| 4,490,970 A | 1/1985 | Curl |
| 4,911,681 A * | 3/1990 | Funkhouser ................. 474/145 |
| 4,932,925 A * | 6/1990 | Roinestad et al. .......... 474/206 |
| 4,951,807 A * | 8/1990 | Roinestad et al. .......... 198/778 |
| 5,004,097 A * | 4/1991 | Roinestad et al. ....... 198/803.1 |
| 5,141,102 A * | 8/1992 | Roinestad et al. .......... 198/852 |
| 5,176,249 A * | 1/1993 | Esterson et al. |
| 5,431,275 A * | 7/1995 | Faulkner ..................... 198/853 |
| 5,566,817 A | 10/1996 | Meeker |
| 5,590,755 A | 1/1997 | Daringer et al. |
| 5,622,252 A * | 4/1997 | Raum ........................ 198/778 |
| 5,906,270 A * | 5/1999 | Faulkner ..................... 198/853 |
| 5,954,187 A * | 9/1999 | Hager ........................ 198/778 |
| 6,059,097 A * | 5/2000 | Clopton ...................... 195/852 |

\* cited by examiner

Primary Examiner—Christopher P. Ellis
Assistant Examiner—Khoi H. Tran
(74) Attorney, Agent, or Firm—Burns, Doane, Swecker & Mathis, L.L.P.

(57) ABSTRACT

A conveyor belt for conveying product in a direction of travel having a plurality of pivotal transverse rods extending laterally across the belt, the transverse rods having inner and outer ends along inner and outer edges of the belt; a plurality of connecting links arranged in at least one longitudinal row along the inner and outer edges of the belt and pivotally interconnecting the inner and outer ends of the transverse rods, respectively, with each of the connecting links having a pair of openings extending laterally therethrough such that the transverse rods extend through the openings; and double weld connections between the rods and the connecting links, each of the double weld connections including a first weld connection point between a trailing side of the transverse rod and the connecting link and a second weld connection point between a leading side of the transverse rod and the connecting link. A method of manufacturing the conveyor belt includes providing a plurality of transverse rods, providing a plurality of connecting links having a first pair of openings extending laterally therethrough and a second pair of openings extending therethrough, arranging the transverse rods through the first and second pair of openings so as to pivotally interconnect the transverse rods in a longitudinally spaced arrangement, and welding the connecting links to the transverse rods at the first pair of openings on both a leading side of the transverse rod and on a trailing side of the transverse rod.

27 Claims, 6 Drawing Sheets

CONVEYOR BELT AND METHOD OF MAKING THE SAME

TECHNICAL FIELD

The present invention relates generally to a conveyor belt and a method of making the same and, more particularly, to a conveyor belt capable of withstanding increased belt tension and exhibiting an extended belt life.

BACKGROUND OF THE INVENTION

One of the most commonly used types of conveyor belts for carrying diverse products along both straight and horizontally curved paths is a grid conveyor belt. Examples of conventional grid conveyor belts are the Cam-Grid® and the heavy duty Cam-Grid® conveyor belts available from Cambridge, Inc., the assignee of the present invention. A grid conveyor belt is shown generally in FIGS. 1 and 2 by reference numeral 100. Conveyor belt 100 includes a plurality of spaced transverse rods 110 slidably interconnected by at least two rows of U-shaped connecting links 120 disposed respectively along the inner and outer edges of the rods. The terminal ends of the transverse rods 110 are formed into enlarged heads or button heads 130 which retain the links on the rods and welds 140 are then provided to secure the link to the button head and to the rod, thereby preventing rotational movement of the links on the transverse rods. Alternatively, bar links may be provided between the button head and the U-shaped connecting link such that the weld therebetween is eliminated. The connecting links are disposed in a nested relationship relative to one another with slots being provided in the links in order to slidably receive the transverse rods. Although not illustrated, the transverse rods may also be provided with an overlay which can be used to support smaller products which may slip between the spacing of the rods or which must lay flat during the conveying operation.

Grid conveyor belts of this type have met with overwhelming market approval because of their ability to travel in straight line conveyor paths as well as in curved conveyor paths, thus making grid conveyor belts ideal for use on spiral cage conveyors. In a spiral cage conveyor, the belt travels in a helical or spiral direction and is driven by cage bars disposed within the center of the spiral which engage the inner edge of the conveyor belt. Despite their popularity and commercial success, however, grid conveyor belts are prone to a number of operational problems which result in undesirable performance characteristics and may ultimately lead to complete belt failure. Examples of such operational problems include weld fatigue, tenting, racking, buckling, and shug, each of which is further discussed below.

Referring to FIG. 2, the cage bars 150 of a spiral conveyor move slightly faster than the speed of the conveyor belt 100 in order to lower the tension in the belt. As a result, all of the belt and product weight is transmitted to the outer edge of the belt which is not collapsed. The outer edge links and the welds thereon are thereby placed under increased tension. Further, because the cage bars 150 are moving slightly faster than the conveyor belt 100, the bars 150 tend to push the inner edge links and the welds thereon into slight compression.

The cyclic nature in which the tension is caused in the conveyor belt leads to a variety of possible causes for belt failure. More specifically, while the conveyor belt is running in a straight travel path, the tension in the conveyor belt is evenly distributed to both the inner and the outer edges. As the belt moves into a curved path, however, the outer edge of the conveyor belt receives a much greater portion of the belt tension while the inside edge is put under a slight compression or tension. Each time this situation arises, that is, each time the conveyor belt transitions between a straight path and a curved path, the welds between the transverse rods and the links pass through a "duty cycle." Repeated duty cycles of this nature may eventually cause weld fatigue, which generally occurs first on the outer edge links where the higher magnitude of tension occurs and which is followed by weld fatigue of the inner edge links.

Referring also to FIG. 3, the conventional weld 140 between the connecting link and the transverse rod is subjected to a variety of forces during conveyor belt travel. That is, the weld is subjected to tension forces denoted by arrows A which represent the tension transmitted through the connecting link to the welded joint, and by torque and shear forces denoted by arrows B which represents the torque force encountered from the drive sprockets. The resulting combination of these forces may result in weld fatigue such that eventually the welded attachment point cracks, i.e., there is a weld failure.

While weld fatigue in itself may not significantly impede the operation of the conveyor system, it may be a precipitating factor for other belt problems, such as belt tenting. Belt tenting can be described as the connecting links bending upwards out of the travel plane of the conveyor belt. When the conveyor belt collapses into a turn, compressive forces act to collapse the inner edge links and thereby allow the belt to traverse the curved path. However, without the presence of secure welds to restrict the rotational movement of the link relative to the rod, the links may raise out of the travel plane of the conveyor belt and form an upstanding tent. Tenting may cause undesirable movement and damage to the conveyed product, as well as a complete failure of the conveying system if machinery components should become jammed as a result of the raised or tented connecting links.

In addition to the welds creating a potential source for system failure, the structural limitations of the transverse rods may also lead to a variety of belt problems such as, for example, racking and buckling, which are a result of the rods flexing when they are driven. Racking occurs when the outside edge of the conveyor belt leads the inner edge of the conveyor belt, or vice versa, due to the increasing tension in the conveyor belt exceeding the bending strength of the transverse rod. Thus, as the conveyor belt traverses either a drive sprocket, idler roll, or the like, it may cause damage to the rods, overlays, and/or sprockets, in addition to causing damage to the conveyed product and misalignment of the conveying system. A further condition which may arise when the strength of the transverse rod is exceeded by the tension in the conveyor belt is buckling. Buckling generally involves a bending of the transverse rod in one or more places when the rods are pushed into the cage bars of a spiral conveyor or into dead curves because of the increased tension in the conveyor belt. Buckling may cause rod failure and product damage, and in the worse case, it can also lead to structural jamming and failure of the conveying system.

Finally, although not directly related to the failure of any particular conveyor belt component, grid conveyor belts may also suffer from the phenomenon of belt shug. Since the connecting links of a conveyor belt are disposed in a nested relationship relative to one another, an internal clearance is produced between the mating links when in the extended position. As shown in FIG. 4, the accumulated lateral clearance of the conveyor belt, commonly referred to as shug and shown by the reference "G", can cause the belt to run in a crooked path rather than the desired straight path.

This especially creates problems with edge drive units, such as spiral cage conveyors, and can also cause potential problems in product movement, vibration, and/or damage to the conveying system and product.

SUMMARY OF THE INVENTION

In order to overcome these disadvantages, the present invention provides a conveyor belt having a plurality of pivotal transverse rods extending laterally across the belt, with the transverse rods having inner and outer ends along inner and outer edges of the belt; a plurality of connecting links arranged in at least one longitudinal row along the inner and outer edges of the belt and pivotally interconnecting the inner and outer ends of the transverse rods, respectively, with each of the connecting links having a pair of openings extending laterally therethrough such that the transverse rods extend through the openings; and double weld connections between the rods and the connecting links, each of the double weld connections including a first weld connection point between a trailing side of the transverse rod and the connecting link and a second weld connection point between a leading side of the transverse rod and the connecting link.

The present invention also provides a method of manufacturing a conveyor belt including the steps of providing a plurality of transverse rods, providing a plurality of connecting links having a first pair of openings extending laterally therethrough and a second pair of openings extending therethrough, arranging the transverse rods through the first and second pair of openings so as to pivotally interconnect the transverse rods in a longitudinally spaced arrangement, and welding the connecting links to the transverse rods at the first pair of openings on both a leading side of the transverse rod and on a trailing side of the transverse rod.

In a further embodiment of the invention, a grid conveyor belt is disclosed as including a plurality of pivotal transverse rods extending laterally across the belt, the transverse rods having inner and outer ends along inner and outer edges of the belt, and a plurality of connecting links arranged in at least one longitudinal row along the inner and outer edges of the belt and pivotally interconnecting the inner and outer ends of the transverse rods, respectively, each of the connecting links having a pair of openings extending laterally therethrough such that the transverse rods extend through the openings, and wherein the transverse rods have a non-circular cross section.

Another embodiment of a grid conveyor belt according to the present invention includes a plurality of pivotal transverse rods extending laterally across the belt, the transverse rods having inner and outer ends along inner and outer edges of the belt, and a plurality of connecting links arranged in at least one longitudinal row along the inner and outer edges of the belt and pivotally interconnecting the inner and outer ends of the transverse rods, respectively, with each of the connecting links having a pair of openings extending laterally therethrough such that the transverse rods extend through the openings, and wherein the transverse rods include at least one wear mark for seating the connecting links in predetermined locations.

Combinations of the above features of the various embodiments of the present invention can of course also be made.

BRIEF DESCRIPTION OF THE FIGURES

These, and other objects, features, and advantages of the present invention will become more readily apparent to those skilled in the art upon reading the following detailed description, in conjunction with the appended drawings in which.

DESCRIPTION OF PREFERRED EMBODIMENTS

Figure 1:
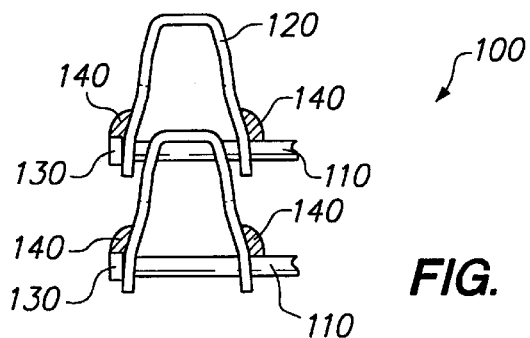
FIG. 1 is a plan view of a conventional connecting link for a conveyor belt.
Figure 2:
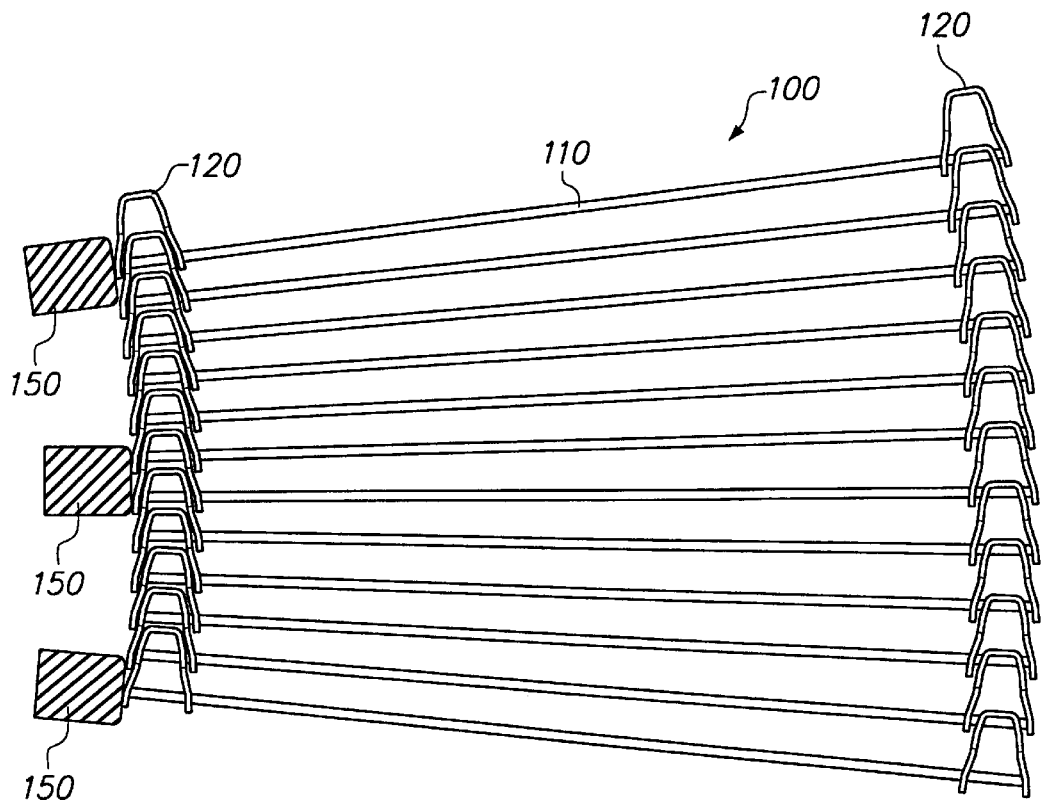
FIG. 2 is a plan view of a conventional spiral cage conveyor system.
Figure 3:
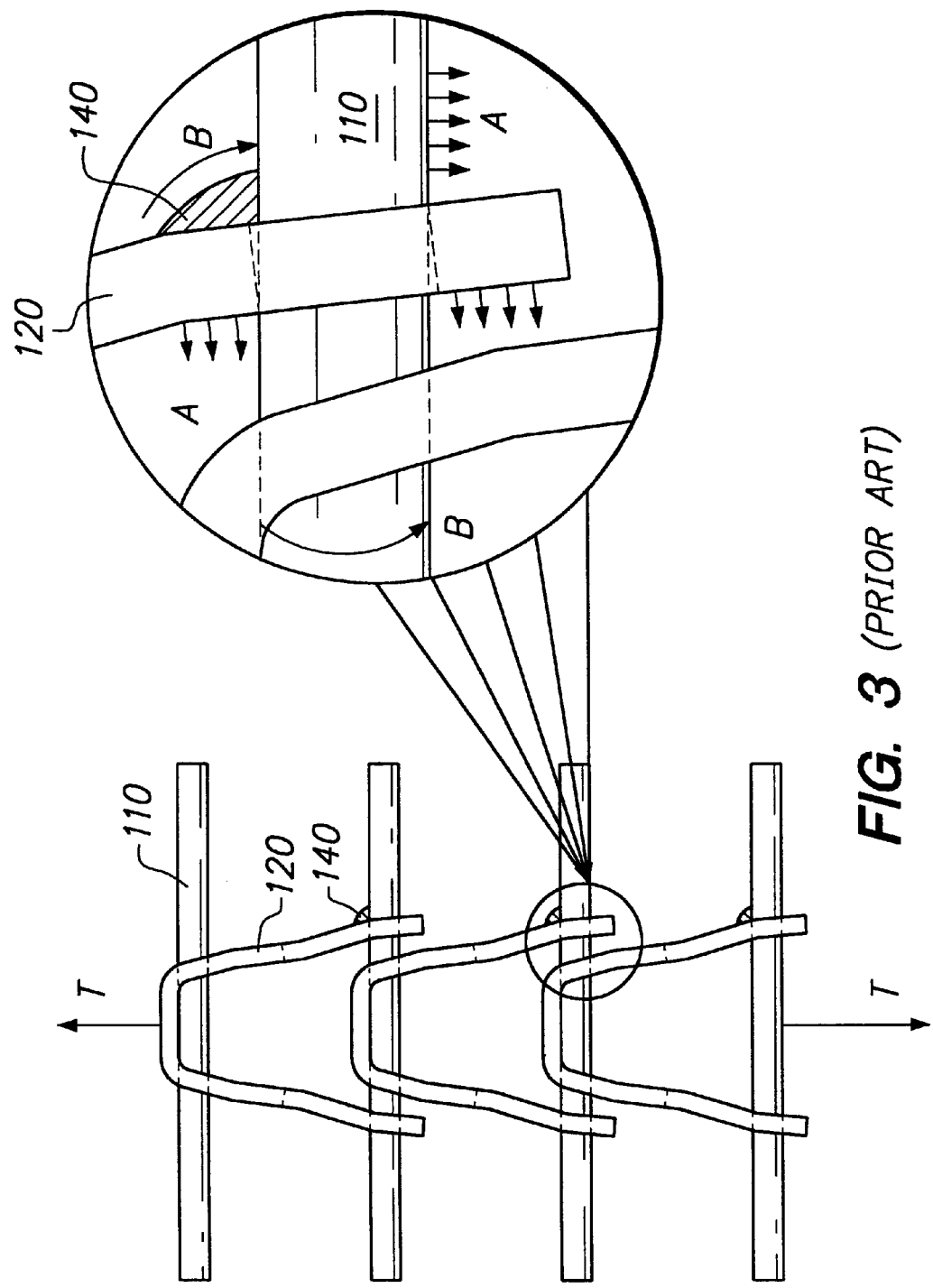
FIG. 3 is a schematic illustration of the forces acting on a welded connection of the conveyor belt.
Figure 4:
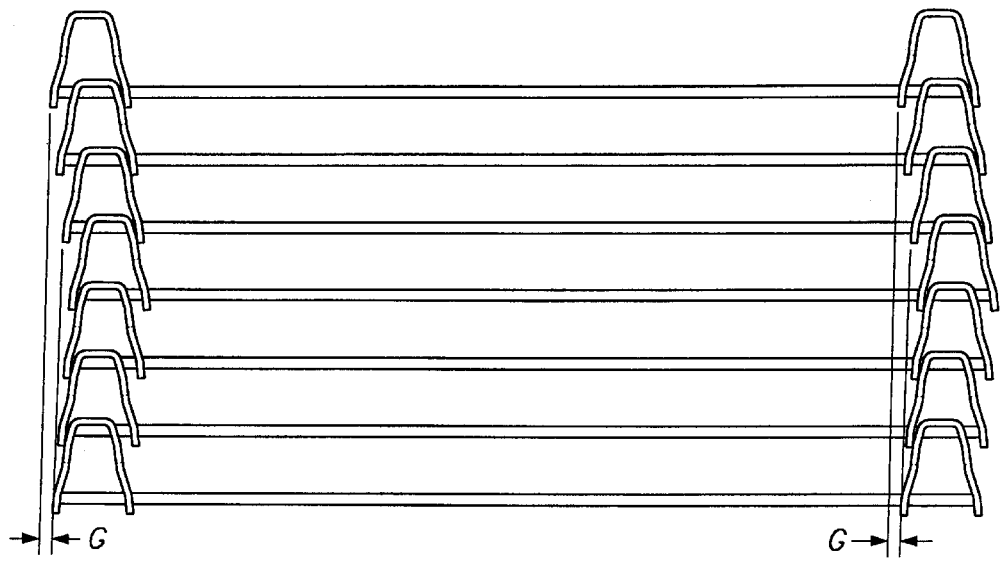
FIG. 4 is a plan view of a conventional conveyor belt.
Figure 5:
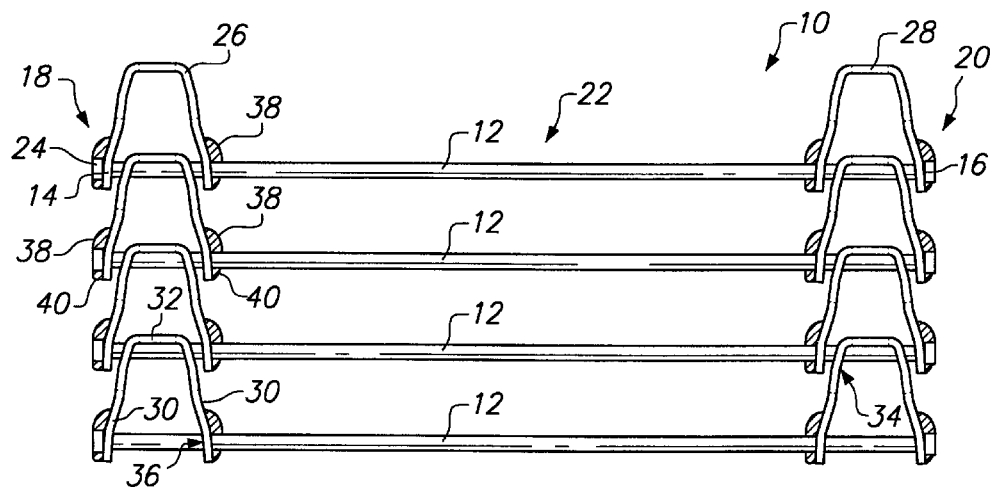
FIG. 5 is a plan view of a conveyor belt according to the present invention

Referring to FIG. 5, a conveyor belt in accordance with the present invention is shown generally by reference numeral 10. Conveyor belt 10 is a grid type belt comprising a plurality of longitudinally spaced, transversely extending rods 12. Rods 12 have inner and outer ends 14 and 16, respectively, located along the inner and outer edges 18 and 20 of belt 10, with central portions 22 extending between the inner and outer ends 14 and 16. Each of the rod ends 14 and 16 is provided with an integral, enlarged head or button head 24.

A row of inner links 26 pivotally interconnect the rods 12 at the inner edge 18 of the conveyor belt and a row of outer links 28 pivotally interconnect the rods 12 at the outer edge 20 of the conveyor belt. As discussed further below, the inner links 26 and the outer links 28 are rigidly fixed to the enlarged button heads 24 by a welded connection point 38 disposed on each side of the link. Although not illustrated, reinforcing bar links may also be provided between the button head and the link.

Each of the connecting links 26 and 28 includes two transversely spaced, longitudinally extending legs 30 which are connected together at one end thereof by a base portion 32. In a preferred embodiment of the invention, the legs 30 have at least one stepped portion which thereby results in base portion 32 being narrower than a distance between the free ends of the legs 30. Thus, the links are allowed to be suitably nested together with the narrow base portion 32 being received between the free ends of the legs 30 when the conveyor belt traverses a curved path. The legs 30 of each of the links 26 and 28 are provided with longitudinally extending slots 34 for slidably receiving an adjacent transverse rod 12 and each of the legs 30 further include a generally circular opening 36 for receiving a transverse rod 12 to which the link is secured.

In a conventional conveyor belt, two weld connection points are used between each link and the leading edge of the respective transverse rod. The openings 36 in the links are generally slightly larger than the transverse rod passing therethrough. Thus, as the weld cools it contracts and draws the transverse rod toward the leading edge of the opening 36. As a result, this causes the weld to absorb the full tension between the link and the weld without having the benefit of the cross-sectional area of the link which could assist in carrying the distributed load. However, even if the opening 36 was an interference fit with no clearance, as the opening elongated due to yielding and wear, the weld would still eventually come under full tension and result in weld fatigue.

Figure 6:
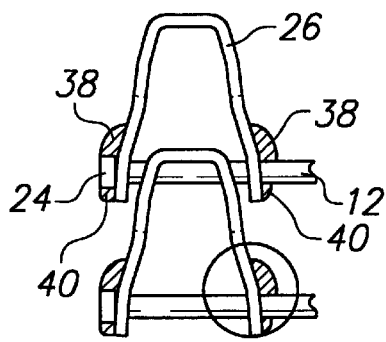
FIG. 6 is a partial enlarged view of the conveyor belt shown in FIG. 5.
Figure 6A:
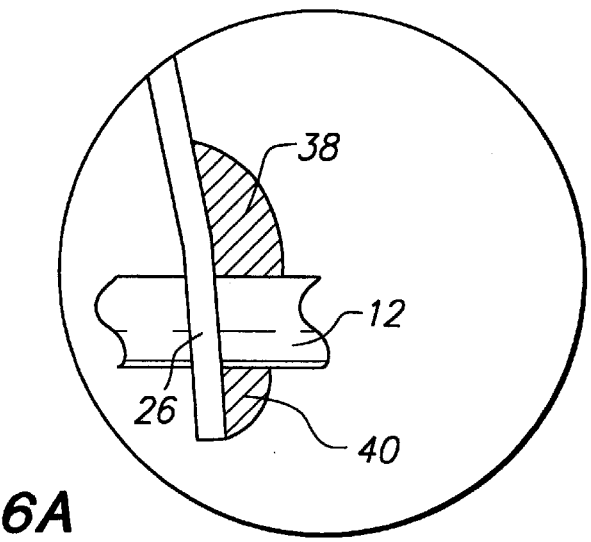
FIG. 6A is an enlarged view of the double compression weld according to the present invention.

In order to prevent the fatigue of weld connection points 38, the present invention further provides a trailing weld connection point 40 between the trailing side of the transverse rod and the respective edge of the connecting link, as best shown in FIGS. 6 and 6A. The presence of the trailing weld connection point 40 in combination with the weld connection point 38 creates a state of residual tension in the cooperating welded arrangement. Thus, no matter which direction the rod is driven in the plane of the conveyor belt, at least one of the weld connection points 38 or 40 will come under compression and thereby reduce the overall tension within the welded arrangement.

Figure 7A:
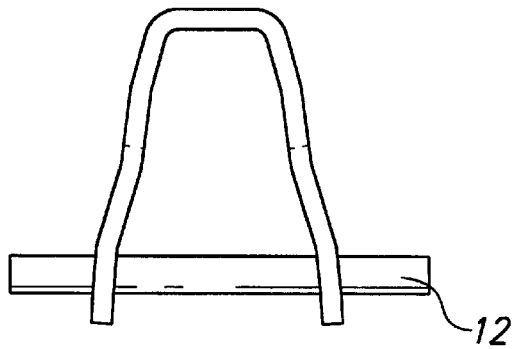
FIGS. 7A and 7B illustrate a step in the welding methodology of the present invention.
Figure 7B:
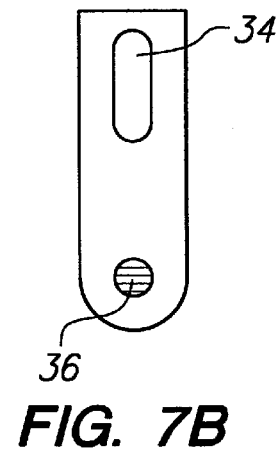
Figure 8A:
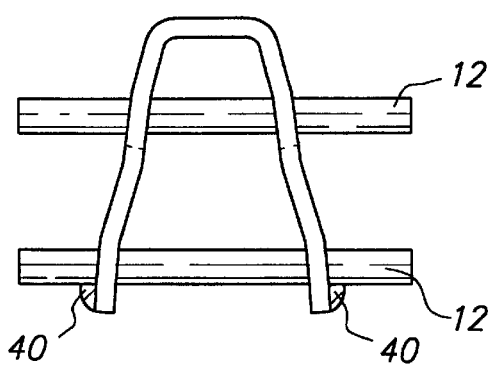
FIGS. 8A and 8B illustrate a step in the welding methodology of the present invention.
Figure 8B:
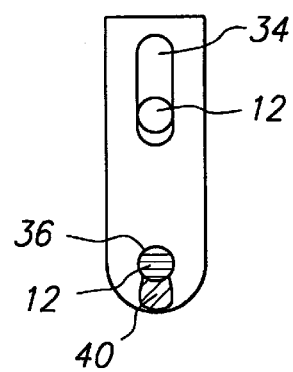
Figure 9A:
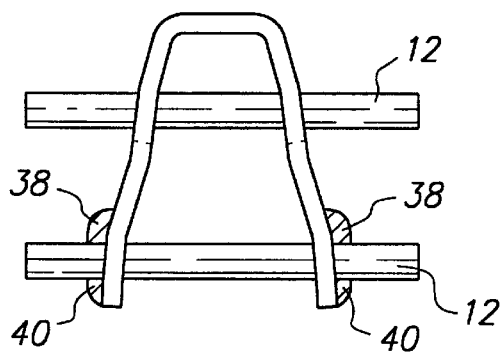
FIGS. 9A and 9B illustrate a step in the welding methodology of the present invention.
Figure 9B:
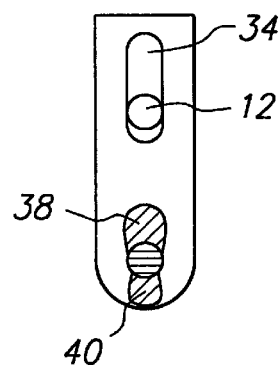

Referring to FIGS. 7–9, the method of forming the double weld arrangement of the present invention is further explained. As shown in FIGS. 7A and 7B, the conveyor belt 10 is assembled as conventionally done by placing the transverse rods 12 through the slots 34 and openings 36 within the legs of the connecting links. As shown in FIGS. 8A and 8B, the trailing weld connection point 40 is preferably created by applying an undersized tack weld between the trailing side of the transverse rod and the respective link. Thereafter, the trailing weld connection point 40 is allowed sufficient time to cool and in so doing draws or pulls the transverse rod toward the trailing end of the generally oversized opening 36 and adds the cross-sectional area of the link to the compressive strength of the trailing weld connection point 40. After the trailing weld connection point 40 has sufficiently cooled, the weld connection points 38 are formed by applying a standard sized weld to the leading side of the transverse rod between the rod and the connecting link. As the weld connection point 38 cools, it in turn attempts to draw or pull the transverse rod toward the leading end of the opening 36, thus resulting in both weld connection points 38 and 40 being in residual tension. As a result, when the transverse rod is moved in either direction during operation of the conveyor, the welded joint is placed under compression rather than tension. Accordingly, through the formation of the trailing weld connection point 40 and thus a double compression weld in accordance with the present invention, weld fatigue is essentially eliminated as a source of belt failure In a preferred embodiment of the present invention, plasma welding is used to form the weld connection points 38 and 40. As should be apparent to one skilled in the art, however, other welding techniques and various welding materials could of course also be used to form the double compression weld within the scope of the present invention. Still further, although in the above-described preferred embodiment of the present invention the trailing weld connection point 40 is formed first, it is within the scope of the present invention to form either the trailing weld connection point 40 or the weld connection point 38 first, and then perform the remaining welding operation to obtain the double compression weld of the present invention.

Figure 10:
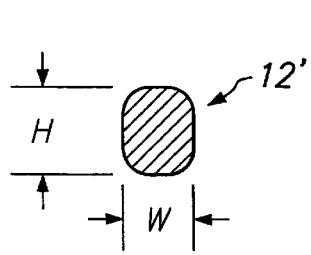
FIG. 10 is a cross-sectional view of a transverse rod according to a further embodiment of the present invention.

While the double compression weld of the present invention is successful in overcoming the problems associated with weld fatigue and tenting which may be caused as a result thereof, double compression welding does not compensate for the flexure strength of the transverse rods being exceeded by the tension in the conveyor belt, and thus leading to racking and buckling. In order to overcome these disadvantages, the present invention further provides a transverse rod 12' which has been flattened, as shown in FIG. 10, so as to increase the strength of the transverse rod while minimizing the impact thereof on the overall belt weight. More particularly, the transverse rod is flattened by a rod forming apparatus or a separate device so as to provide increased strength in the plane of belt travel, thereby preventing buckling and racking. In a preferred embodiment of the present invention, the transverse rod 12' is provided with a height H of approximately 0.226 inches and a width W of approximately 0.192 inches, and it is formed by flattening a 0.216 inch diameter rod. By flattening the 0.216 inch diameter rod, the present invention achieves a strength in the plane of belt travel which is substantially the same as or greater than that achieved by a 0.225 inch diameter rod, but while still maintaining the weight of the 0.216 diameter rod. This ability to achieve increased strength without a corresponding increase in the weight can save as much as 0.65 pounds per lineal foot of belting.

Although the 0.216 inch diameter rod is discussed above as a preferred embodiment of the present invention, rods having a diameter of approximately 0.216 inches to approximately 0.220 inches, or greater or lesser diameters depending upon the end application, may be used in the conveyor belt of the present invention. In addition to increasing the strength of the transverse rod, to flattening operation also serves to align all of the grains within the rod perpendicular to the plane of belt travel and thus greatly increases the bending strength of the rod due to work hardening and improves the wear resistance of the rod in extended life operations.

Figure 11:
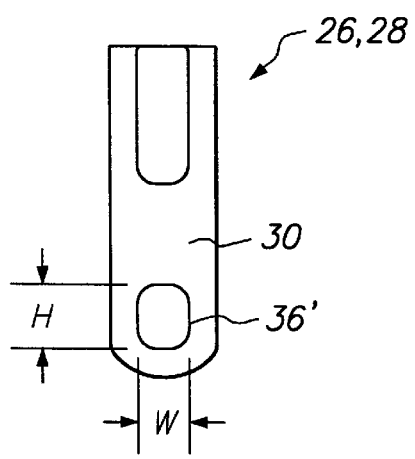
FIG. 11 is a side elevational view of a connecting link according to a further embodiment of the present invention.

In order to better accommodate the flattened transverse rod 12' with the link, the present invention further provides an opening 36' in the legs 30 of the connecting links 26 and 28 which is appropriately dimensioned to correspond to the flattened rod. As shown in FIG. 11, opening 36' is dimensioned for receiving rod 12' as set forth above and has a preferred height H of approximately 0.263 inches and a width W of approximately 0.205 inches. The dimensions of opening 36' will of course be varied depending upon the dimensions of the flattened transverse rod, which will of course vary depending on the circular diameter rod from which it is formed, with the goal to be having an opening 36' which is slightly oversized relative to the desired rod dimensions. The use of the flattened transverse rod alone and/or in combination with the similarly dimensioned opening 36' sufficiently strengthens the rods of the conveyor belt such that the tension in the belt will not significantly exceed the structural limitations of the transverse rods. As such, racking and buckling can be substantially prevented.

Figure 12:
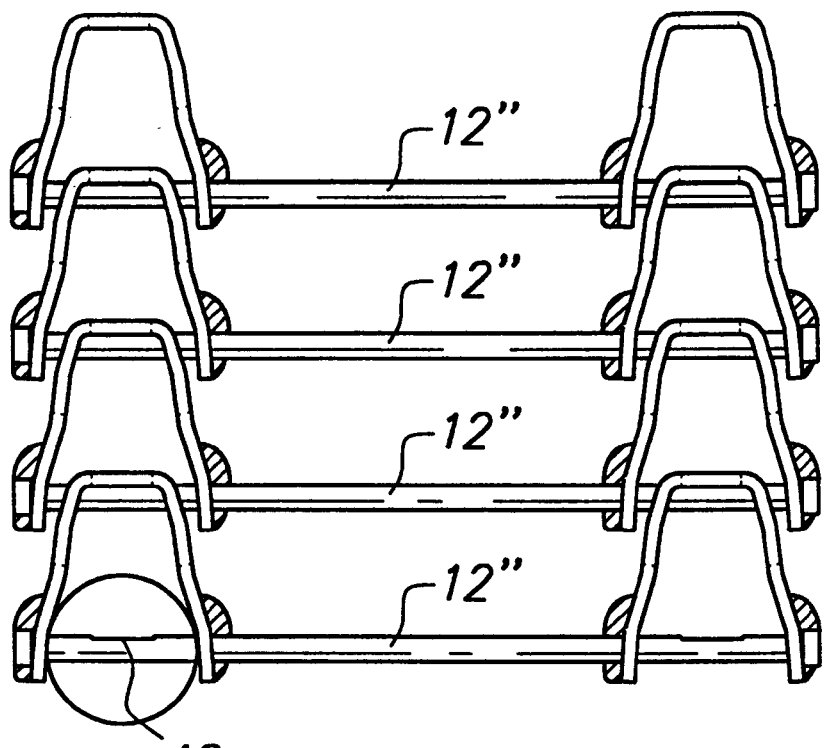
FIG. 12 is a plan view of a conveyor belt according to a still further embodiment of the present invention and FIG. 12A is an enlarged view of a transverse rod thereof.
Figure 12A:
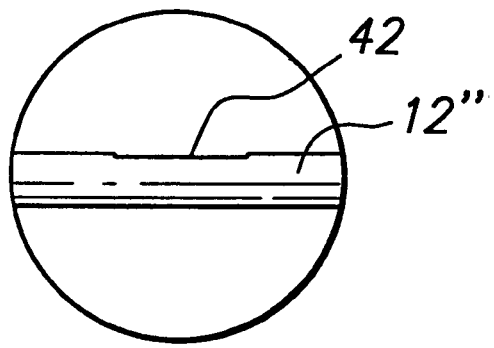

The remaining problem to which the present invention is directed concern belt shug. It has been found in grid conveyor belts that the lateral shifting or shug commonly occurring when a belt is new is gradually reduced as the belt wears from ordinary usage. More specifically, it has been found that as the belt undergoes repeated duty cycles, the transverse rods will eventually form a groove in the underside contacting portion of the connecting link and the rods will develop a corresponding cupped surface. This groove thereby seats the connecting link relative to the transverse rod and inhibits further lateral shifting. In order to promote the formation of these wear grooves in a predetermined location, i.e., one that would promote straight belt travel, the present invention further provides a rod 12" having at least one crimp or wear mark 42 initially formed in the rod, as shown in FIG. 12. The rod 12" may be formed from a conventional circular transverse rod 12 or the flattened rod 12' discussed above. In use, the connecting links 26 and 28 are each preferably initially seated within a crimp 42 and, as long as at least one edge of the belt remains in tension, the conveyor belt is prevented from laterally shifting or shugging. The wear mark 42 also ensures a contact surface between the underside of the link and the rod such that the load may be distributed over the contact surface rather than merely a point contact. The wear mark 42 does not interfere however with the ability of the conveyor belt to turn in either a left curve or a right curve travel path. Thus, the conveyor belt having transverse rods 12" may be flipped or turned over for use in a conveyor belt in either direction.

Although shown and discussed above as independent features, it is within the scope of the present invention and most preferred to provide conveyor belt 10 with all of the various features disclosed herein, more specifically, double compression welds, non-circular transverse rods and corresponding link openings, and wear marks on the transverse rods. By combining these various features, the present invention provides a conveyor belt which successively overcomes problems associated with weld fatigue and, while carrying a fifty percent increased load, it still achieves an average belt life that is 2.5–3.5 times greater than a conventional belt of similar weight and size. Although belt failure may ultimately occur, such failures have been found to be due to rod wear rather than fatigue or other deteriorative conditions. Other combinations could, of course, also be utilized, such as only double compression welds and non-circular transverse rods and corresponding link openings, or only double compression welds, and all such combinations would be apparent to one skilled in the art.

While the present invention has been described with respect to the preferred embodiments, it is to be understood that variations and modifications may be resorted as will be apparent to those skilled in the art. Such variations a modifications are to be considered within the purview and the scope of the claims appended hereto.

What is claimed is:

1. A conveyor belt for conveying product in a direction of travel including a straight transport course and at least one course turn deviating in a direction selected from the group consisting of a left course turn and a right course turn, said conveyor belt comprising:

a plurality of pivotal transverse rods extending laterally across the belt, said transverse rods having inner and outer ends along inner and outer edges of the belt;

a plurality of connecting links arranged in at least one longitudinal row along the inner and outer edges of the belt and pivotally interconnecting the inner and outer ends of the transverse rods, respectively, each of said connecting links having a pair of longitudinally extending legs and an opening extending laterally through each said leg such that said transverse rods extend through said openings; and a double weld connection between each said rod and each said leg of said plurality of connecting links, each said double weld connection including a first weld connection point between a trailing side of said transverse rod and said connecting link and a second weld connection point between a leading side of said transverse rod and said connecting link, said first and second weld connections points defining separate and distinct welds;

wherein said plurality of transverse rods have a non-circular cross section.

2. A conveyor belt for conveying product in a direction of travel, said conveyor belt comprising:

a plurality of pivotal transverse rods extending laterally across the belt, said transverse rods having inner and outer ends along inner and outer edges of the belt;

a plurality of connecting links arranged in at least one longitudinal row along the inner and outer edges of the belt and pivotally interconnecting the inner and outer ends of the transverse rods, respectively, each of said connecting links having a pair of longitudinally extending legs and an opening extending laterally through each said leg such that said transverse rods extend through said openings; and double weld connections between said rods and each said leg of said plurality of connecting links, each said double weld connection including a first distinct weld connection point between a trailing side of said transverse rod and said connecting link and second distinct weld connection point between a leading side of said transverse rod and said connecting link.

3. The conveyor belt of claim 2, wherein each of said connecting links includes an inner link side and an outer link side, said double weld connections being disposed on both said inner link side and said outer link side.

4. The conveyor belt of claim 2, wherein said first weld connection point is smaller than said second weld connection point.

5. The conveyor belt of claim 2, wherein said double weld connections are formed by plasma welding.

6. The conveyor belt of claim 2, wherein said transverse rods have a circular cross section.

7. The conveyor belt of claim 2, wherein said transverse rods have a non-circular cross section.

8. The conveyor belt of claim 7, wherein said transverse rods have a first dimension in the direction of belt travel and a second dimension perpendicular thereto, said first dimension being greater than said second dimension.

9. The conveyor belt of claim 7, wherein said openings in said connecting links have a non-circular shape generally corresponding to the cross section of said transverse rods.

10. The conveyor belt of claim 7, wherein said transverse rods include at least one wear mark for seating the connecting links in predetermined locations.

11. The conveyor belt of claim 2, wherein said transverse rods include at least one wear mark for seating the connecting links in predetermined locations.

12. A method of manufacturing a conveyor belt, said method comprising:

providing a plurality of transverse rods;

providing a plurality of connecting links having a pair of longitudinally extending legs, a first pair of openings extending laterally therethrough and a second pair of openings extending therethrough;

arranging the transverse rods through the first and second pair of openings of the connecting links so as to pivotally interconnect the transverse rods in a longitudinally spaced arrangement; and welding the connecting links to the transverse rods at the first pair of openings in each said connecting link on both a leading side of the transverse rod and on a trailing side of the transverse rod.

13. The method according to claim 12, wherein said welding step includes applying a first weld to the trailing side of the transverse rod and, thereafter, applying a second weld to the leading side of the transverse rod.

14. The method according to claim 13, wherein said welding step includes, after applying the first weld, allowing the first weld to substantially cool prior to applying the second weld.

15. The method according to claim 13, wherein said step of applying the first weld includes applying a weld having a first weld size and said step of applying the second weld includes applying a weld having a second weld size, the second weld size of the second weld being greater than the first weld size of the first weld.

16. The method according to claim 12, wherein said welding step includes applying a first weld to the leading side of the transverse rod and, thereafter, applying a second weld to the trailing side of the transverse rod.

17. The method according to claim 16, wherein said welding step includes, after applying the first weld, allowing the first weld to substantially cool prior to applying the second weld.

18. The method according to claim 16, wherein said step of applying the first weld includes applying a weld having a first weld size and said step of applying the second weld includes applying a weld having a second weld size, the first weld size of the first weld being greater than the second weld size of the second weld.

19. The method according to claim 12, wherein said step of providing transverse rods includes providing a plurality of transverse rods have a non-circular cross section.

20. The method according to claim 19, wherein said step of providing connecting links includes providing a plurality of connecting links having a pair of first openings with a non-circular shape generally corresponding to the cross section of the transverse rods.

21. The method according to claim 12, wherein said step of providing transverse rods includes providing a plurality of transverse rods having at least one wear mark for seating the connecting links in predetermined locations.

22. A grid conveyor belt for use in a transport course including a straight transport course and at least one course turn deviating in a direction selected from the group consisting of a left course turn and a right course turn, said conveyor belt comprising:

a plurality of pivotal transverse rods extending laterally across the belt, said transverse rods having inner and outer ends along inner and outer edges of the belt; and a plurality of connecting links arranged in at least one longitudinal row along each of the inner and outer edges of the belt and pivotally interconnecting the inner and outer ends of the transverse rods, respectively, each of said connecting links having a pair of openings extending laterally therethrough such that said transverse rods extend through said openings;

wherein said transverse rods have a generally uniform cross section and said cross section is non-circular.

23. The grid conveyor belt of claim 22, wherein said transverse rods are formed by generally uniform circular rods which have been elongated in one direction so as to define a first dimension in a direction of belt travel and a second dimension perpendicular thereto.

24. The grid conveyor belt of claim 23, wherein said first dimension is greater than said second dimension.

25. The grid conveyor belt of claim 22, wherein said openings in said links have a non-circular configuration generally corresponding to the cross section of said transverse rods.

26. The grid conveyor belt of claim 22, wherein said transverse rods include at least one wear mark for seating the connecting links in predetermined locations.

27. The conveyor belt of claim 1, wherein said plurality of transverse rods include at least one wear mark for seating said connecting links in predetermined locations.

* * * * *